(12) United States Patent
Rittenburg et al.

(10) Patent No.: US 10,815,114 B2
(45) Date of Patent: Oct. 27, 2020

(54) EFFERVESCENT LIQUID DISPENSER

(71) Applicant: MIDNIGHT MADNESS DISTILLING, LLC, Trumbauersville, PA (US)

(72) Inventors: Angus Rittenburg, Perkasie, PA (US); Casey Parzych, Trumbauersville, PA (US); Michael K. Boyer, Wilmington, DE (US)

(73) Assignee: MIDNIGHT MADNESS DISTILLING, LLC, Trumbauersville, PA (US)

( * ) Notice: Subject to any disclaimer, the term of this patent is extended or adjusted under 35 U.S.C. 154(b) by 0 days.

(21) Appl. No.: 16/329,131

(22) PCT Filed: Dec. 22, 2017

(86) PCT No.: PCT/US2017/068200
§ 371 (c)(1),
(2) Date: Feb. 27, 2019

(87) PCT Pub. No.: WO2018/125803
PCT Pub. Date: Jul. 5, 2018

(65) Prior Publication Data
US 2019/0225478 A1   Jul. 25, 2019

Related U.S. Application Data

(60) Provisional application No. 62/439,380, filed on Dec. 27, 2016.

(51) Int. Cl.
*B67D 1/04* (2006.01)
*B67D 1/06* (2006.01)
*G05D 16/06* (2006.01)

(52) U.S. Cl.
CPC ......... *B67D 1/0406* (2013.01); *B67D 1/0418* (2013.01); *G05D 16/0655* (2013.01); *B67D 1/0412* (2013.01)

(58) Field of Classification Search
CPC . B67D 1/0406; B67D 1/0412; G05D 16/0655
(Continued)

(56) References Cited

U.S. PATENT DOCUMENTS 2,189,643 A * 2/1940 Ward .................. B67D 1/0412
                                                                141/17
2,199,661 A    5/1940 Gamble et al.
(Continued)

FOREIGN PATENT DOCUMENTS

AU    2011275873 B2    1/2012
DE       19805198 A1    8/1999
(Continued)

OTHER PUBLICATIONS

Innovation, Growler Werks, growlerwerks.com, Apr. 2, 2016.
Darbacap Carbination System, Carba Cap, carbacap.com, Sep. 10, 2015.

*Primary Examiner* — Vishal Pancholi
(74) *Attorney, Agent, or Firm* — McNees Wallace & Nurick LLC

(57) ABSTRACT

A container is disclosed including an effervescent liquid and an effervescent liquid dispenser including pressurized gas from a pressurized gas source, and a regulator in selective fluid communication with the container and the pressurized gas source. In response to a differential pressure applied to the regulator being less than a first threshold value between a container pressure and an environmental pressure of an environment surrounding the dispenser, pressurized gas from the pressurized gas source is permitted to flow into the regulator chamber and the container until the first threshold value is achieved. In response to the differential pressure (Continued)

applied to the regulator being greater than the first threshold value between the container pressure and the environmental pressure, pressurized gas from the pressurized gas source is prevented from flowing into the regulator chamber and the container and in which the liquid dispenser is permanently affixed to the container.

28 Claims, 14 Drawing Sheets

(58) Field of Classification Search
USPC .................. 222/195, 214, 396, 399, 400.7
See application file for complete search history.

(56) References Cited

U.S. PATENT DOCUMENTS

| | | | |
|---|---|---|---|
| 2,606,749 A | | 8/1952 | Bayers, Jr. |
| 2,705,578 A | * | 4/1955 | Burns ............... F16K 13/04 |
| | | | 141/17 |
| 3,217,947 A | | 11/1965 | Bauerlein |
| 3,679,104 A | * | 7/1972 | Giroud ............. B67D 1/0418 |
| | | | 222/396 |
| 4,171,004 A | | 10/1979 | Cerrato et al. |
| 4,265,374 A | | 5/1981 | Sebalos |
| 4,363,424 A | | 12/1982 | Holben et al. |
| 4,479,520 A | | 10/1984 | Holben |
| 4,754,897 A | | 7/1988 | Bruce |
| 4,850,387 A | * | 7/1989 | Bassill ............. B67D 1/0412 |
| | | | 137/212 |
| 5,021,219 A | | 6/1991 | Rudick et al. |
| 5,110,012 A | | 5/1992 | Scholle et al. |
| 5,199,609 A | | 4/1993 | Ash, Jr. |
| 5,443,186 A | * | 8/1995 | Grill ............... B67D 1/0418 |
| | | | 222/396 |
| 5,538,028 A | | 7/1996 | Lombardo |
| 5,549,037 A | | 8/1996 | Stumphauzer et al. |
| 6,021,922 A | | 2/2000 | Bilskie et al. |
| 6,036,054 A | | 3/2000 | Grill |
| 6,073,811 A | | 6/2000 | Costea |
| 6,216,913 B1 | | 4/2001 | Bilskie et al. |
| 6,276,565 B1 | | 8/2001 | Parsons et al. |
| 6,311,875 B1 | | 11/2001 | Anderson et al. |
| 6,360,923 B1 | | 3/2002 | Vlooswijk |
| 6,386,403 B2 | | 5/2002 | Parsons et al. |
| 6,412,668 B1 | | 7/2002 | Vlooswijk et al. |
| 6,415,963 B1 | | 7/2002 | Vlooswijk et al. |
| 6,439,549 B1 | | 8/2002 | Loov |
| 6,530,400 B2 | | 3/2003 | Nelson |
| 6,745,922 B1 | | 6/2004 | Vlooswijk et al. |
| 7,083,071 B1 | | 8/2006 | Crisp, III et al. |
| 7,584,873 B2 | | 9/2009 | Grittmann |
| 7,845,522 B2 | | 12/2010 | Grill |
| 7,984,845 B2 | | 7/2011 | Kelly |
| 8,038,039 B2 | | 10/2011 | Kelly et al. |
| 8,052,012 B2 | | 11/2011 | Kelly et al. |
| 8,066,156 B2 | | 11/2011 | Schiff et al. |
| 8,141,755 B2 | | 3/2012 | Kelly et al. |
| 8,177,103 B2 | | 5/2012 | Pakkert et al. |
| 8,191,470 B2 | | 6/2012 | Hoss et al. |
| 8,302,822 B2 | | 11/2012 | Kranz et al. |
| 8,684,240 B2 | | 4/2014 | Sauer et al. |
| 8,757,439 B2 | | 6/2014 | Kambouris |
| 8,763,866 B2 | | 7/2014 | Oberhofer et al. |
| 8,808,775 B2 | | 8/2014 | Novak et al. |
| 8,915,263 B2 | | 12/2014 | Haines et al. |
| 9,114,971 B2 | | 8/2015 | Rassmussen et al. |
| 9,227,827 B1 | | 1/2016 | Scott |
| 9,248,416 B2 | | 2/2016 | Striebinger |
| 9,272,893 B2 | | 3/2016 | Jacobs |
| 9,289,731 B2 | | 3/2016 | Tatera |
| 9,352,949 B2 | | 5/2016 | Rege et al. |
| 9,409,759 B2 | | 8/2016 | Wilder et al. |
| 9,427,712 B2 | | 8/2016 | Ring et al. |
| 2008/0258099 A1 | | 10/2008 | Hawkins |
| 2011/0017770 A1 | | 1/2011 | Maas et al. |
| 2011/0210141 A1 | * | 9/2011 | Maas ................ B67D 1/0834 |
| | | | 222/1 |
| 2013/0015212 A1 | * | 1/2013 | Lindmayer ........ B67D 1/0418 |
| | | | 222/399 |
| 2013/0233878 A1 | | 9/2013 | Lindmayer |
| 2016/0083239 A1 | | 3/2016 | Rasmussen et al. |
| 2016/0159556 A1 | | 6/2016 | Brouwer et al. |
| 2016/0251210 A1 | | 9/2016 | Hill et al. |
| 2016/0251212 A1 | | 9/2016 | Rege et al. |

FOREIGN PATENT DOCUMENTS

| | | | | |
|---|---|---|---|---|
| DE | 602005004445 T2 | 1/2009 | | |
| DE | 10066425 B4 | 3/2011 | | |
| DE | 102010012175 A1 | 9/2011 | | |
| EP | 0063155 A1 | 10/1982 | | |
| EP | 0080358 A1 | 6/1983 | | |
| EP | 0234797 A1 | 9/1987 | | |
| EP | 0291788 A1 | 11/1988 | | |
| EP | 0372569 A2 | 6/1990 | | |
| EP | 0525833 A2 | 2/1993 | | |
| EP | 0636407 A1 | 2/1995 | | |
| EP | 1096873 A1 | 5/2001 | | |
| EP | 1140657 A1 | 10/2001 | | |
| EP | 1140658 A1 | 10/2001 | | |
| EP | 1140692 A1 | 10/2001 | | |
| EP | 1037850 B1 | 4/2002 | | |
| EP | 2178772 A1 | 4/2010 | | |
| EP | 1888450 B1 | 11/2012 | | |
| EP | 2129596 B1 | 5/2013 | | |
| EP | 2001790 B1 | 5/2015 | | |
| EP | 2861521 B1 | 11/2015 | | |
| FR | 528387 A | 11/1921 | | |
| GB | 2421493 A | 6/2006 | | |
| JP | 2002037394 A1 | 2/2002 | | |
| JP | 2006008249 A | 1/2006 | | |
| JP | 5308066 B2 | 7/2013 | | |
| JP | 5649801 B2 | 11/2014 | | |
| KR | 101387015 B1 | 4/2014 | | |
| NL | 1032890 C2 | * | 5/2008 | ............ B67D 1/008 |
| NL | 1032890 C2 | 5/2008 | | |
| RU | 2362728 C2 | 7/2009 | | |
| WO | 9954252 A1 | 10/1999 | | |
| WO | 2009137877 A1 | 11/2009 | | |
| WO | 2011051740 A2 | 5/2011 | | |
| WO | 2011073702 A1 | 6/2011 | | |
| WO | 2011152717 A1 | 12/2011 | | |
| WO | 2012156709 A2 | 11/2012 | | |
| WO | 2014161985 A1 | 10/2014 | | |
| WO | 2015119497 A1 | 8/2015 | | |
| WO | 2015147636 A1 | 10/2015 | | |
| WO | 2016069066 A1 | 5/2016 | | |
| WO | 2019023059 A1 | 1/2019 | | |
| ZA | 201101530 B | 8/2013 | | |

* cited by examiner

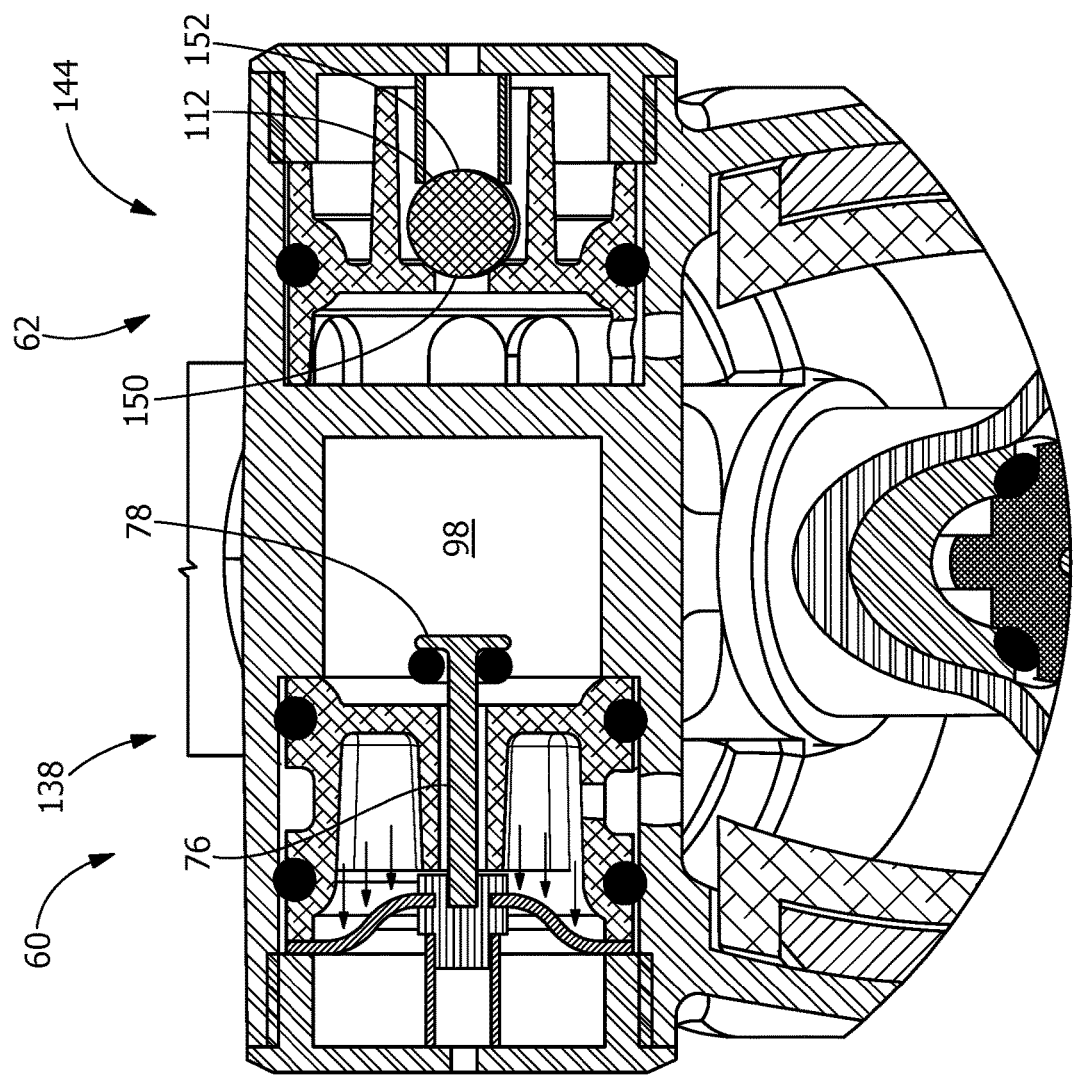
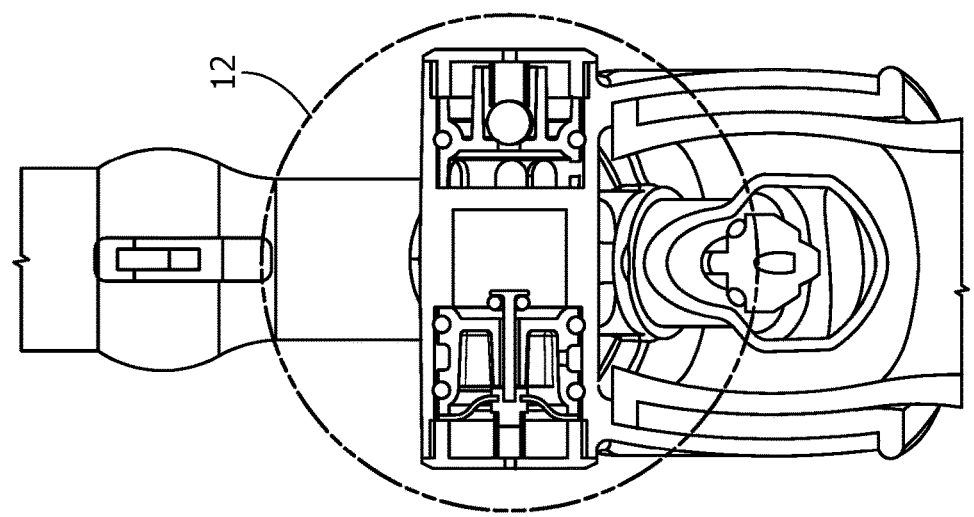
FIG. 12
FIG. 11

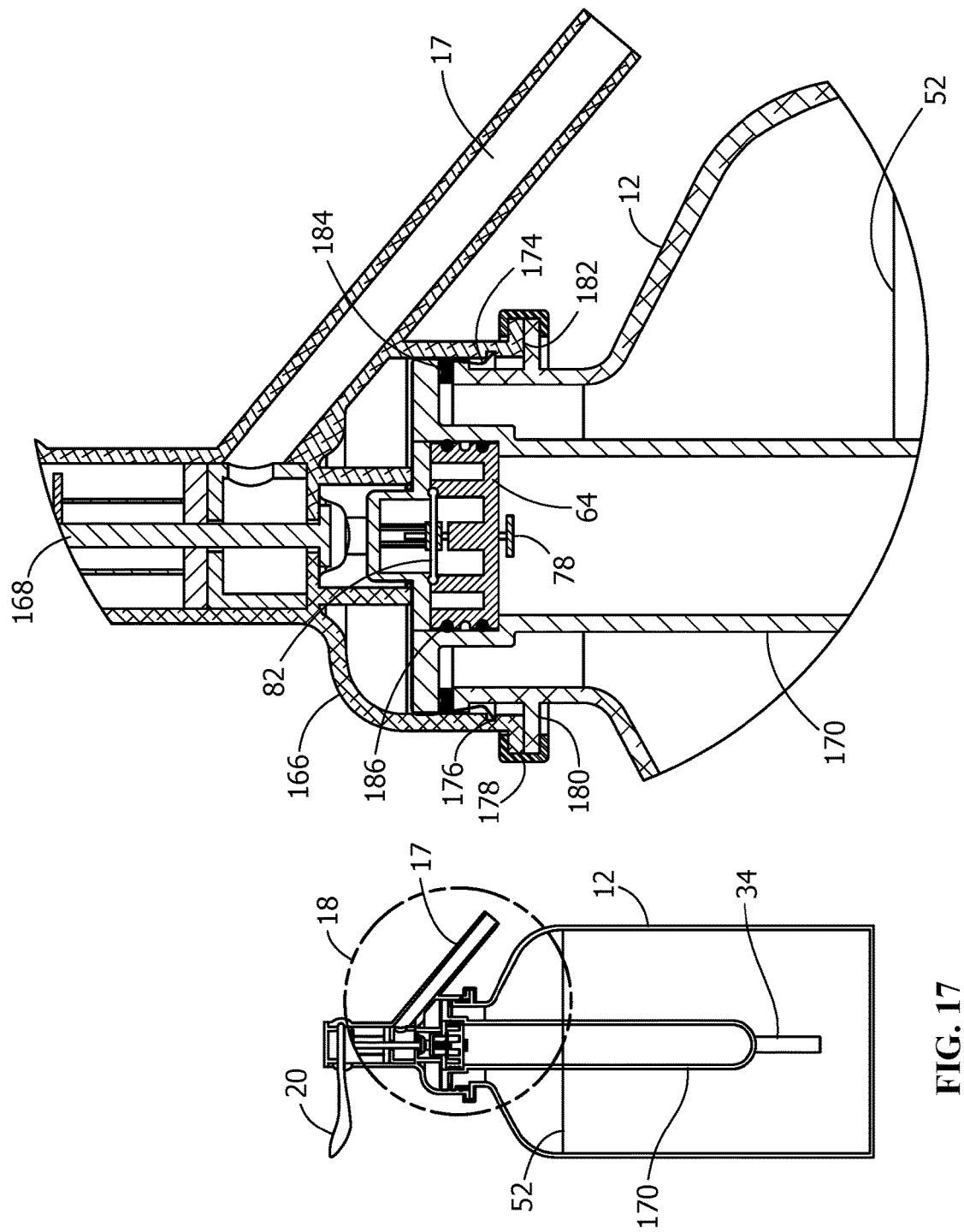

EFFERVESCENT LIQUID DISPENSER

FIELD OF THE INVENTION

The present invention is directed to the field of liquid dispensers, and in particular, to effervescent liquid dispensers.

BACKGROUND OF THE INVENTION

Dispensers for dispensing effervescent liquids subject a liquid to a pressurized gas, such as carbon dioxide, a portion of which pressurized gas dissolves in the liquid. Upon dispensing the liquid from the dispenser into an environment having a lower pressure and/or a lower temperature, the pressurized gas begins escaping from the liquid in the form of bubbles. This is known as effervescence. Such dispensers typically have a container containing liquid, the container receiving pressurized gas from a pressurized gas source. The pressurized gas source is then isolated from the container. The pressurized gas not only brings about effervescence, but provides the impetus for dispensing the liquid from the container.

This conventional dispenser arrangement has several shortcomings. For example, as the liquid is dispensed, the gas pressure in the container is reduced, and the degree of effervescence may likewise be reduced. Furthermore, in an effort to maintain a high degree of effervescence for the liquid irrespective of the amount of liquid remaining in the container, additional pressurized gas may need to be initially introduced into the container. Such additional pressurized gas increases the gas pressure inside the container, which raises safety concerns.

There are several federal regulations which relate to packaging in the liquor industry. For example, current federal regulation (27 C.F.R. § 5.46 (2017)) provides, absent special exceptions, that for liquor bottles having a capacity of 200 mL or more, the headspace cannot exceed 8 percent of the total capacity of the bottle after closure. In order for conventional dispenser arrangements to comply with such regulations (e.g., to dispense the contents of a container with 8 percent or less headspace), would require a headspace pressure of over 300 psi. Glass containers capable of withstanding such a pressure are impractical and unsafe.

Examples of conventional dispensing arrangements are disclosed in U.S. Pat. Nos. 90,215; 2,098,169; 6,415,963; 6,745,922; 8,177,103; 8,191,740; 8,302,822; 9,352,949; U.S. Pub Nos 2016/0251210 and 2016/0251212; EP 2129596; WO 00/35774 and WO 00/35803. The disclosure of the foregoing patents and patent applications is hereby incorporated by reference.

There is a need in the art for effervescent liquid dispensers that do not suffer from these shortcomings.

SUMMARY OF THE INVENTION

The instant invention solves problems associated with conventional dispensing arrangements by providing a safe (e.g., having a reduced risk of rupture or container failure), carbonated liquid dispensing device that employs a disposable container and a permanently affixed closure that maintains carbonation and allows for dispensing of the contents without decreased carbonation. This in turn allows for a consumer product that mimics the behavior of the conventional seltzer siphon such as the one referenced in U.S. 90,215 with added safety and dispensing consistency. Conventional seltzer siphons were partially filled leaving an excess of 25% of the entire volume of the container with a head space containing a pressurized gas between 60 and 120 psi. Such pressures are undesirable when using glass containers or other containers that failure catastrophically, and are avoided by the instant invention. In addition, as the contents of the conventional seltzer siphon were dispensed, the pressure in the head space decreases, thus gas dissolved in the fluid is released thereby decreasing overall effervescence. Another variation on the conventional seltzer siphon disclosed, for example, in U.S. Pat. No. 2,098,169A, which requires the user to acquire and insert a pressurized cartridge and, thereafter, replace a spent cartridge. Such replaceable pressurized cartridges are not required by the instant invention.

One embodiment of the instant invention relates to a disposable (i.e., not refillable or reusable) alcoholic beverage packaging that can maintain carbonation and self-dispense a carbonated beverage while being compliant with the headspace requirements of 27 C.F.R. § 5.46 (2017) (https://www.gpo.gov/fdsys/pkg/CFR-2017-title27-vol1/pdf/CFR-2017-title27-vol1-part5.pdf), which provides, absent special exceptions, that for liquor bottles having a capacity of 200 mL or more, the headspace cannot exceed 8 percent of the total capacity of the bottle after closure. In addition, when charged with a division 2.2 gas, such as carbon dioxide (UN 1013), which is a non-flammable, nonpoisonous compressed gas, the instant invention's design meets the limited quantities exemption set forth in 49 C.F.R. § 173.306 (2017) (https://www.gpo.gov/fdsys/pkg/CFR-2017-title49-vol2/pdf/CFR-2017-title49-vol2-part173.pdf), pursuant to 49 C.F.R. § 173.306(a)(1) & (i) (i.e., not more than 4 fluid ounces capacity for carbon dioxide), which in turn exempts the invention from various shipping requirements under United States law. This aspect of the design is consistent with the limited quantities exemption recognized internationally pursuant to § 1.1.1.5 and Chapter 3.4 of the United Nations Recommendations on the Transport of Dangerous Goods Model Regulations (Rev. 20, 2017) (https://www.unece.org/trans/danger/publi/unrec/rev20/20files_e.html) (carbon dioxide quantity limit for inner packaging or article of 120 mL). All of the above regulations are incorporated by reference.

One embodiment of the present invention is directed to an effervescent liquid dispenser including pressurized gas from a pressurized gas source. A container is provided containing liquid to be dispensed receiving pressurized gas from the pressurized gas source, becoming a pressurized liquid, the pressurized liquid becoming an effervescent liquid upon being dispensed from the container. A regulator is provided in selective fluid communication with the container and the pressurized gas source. In response to a differential pressure applied to the regulator being less than a first threshold value between a container pressure and an environmental pressure of an environment surrounding the dispenser, pressurized gas from the pressurized gas source is permitted to flow into the regulator chamber and the container until the first threshold value is achieved. In response to the differential pressure applied to the regulator being greater than the first threshold value between the container pressure and the environmental pressure, pressurized gas from the pressurized gas source is prevented from flowing into the regulator chamber and the container.

One embodiment of the present invention is directed to a container including an effervescent liquid and an effervescent liquid dispenser including pressurized gas from a pressurized gas source. A regulator is provided in selective fluid communication with the container and the pressurized gas source. In response to a differential pressure applied to the regulator being less than a first threshold value between a container pressure and an environmental pressure of an environment surrounding the dispenser, pressurized gas from the pressurized gas source is permitted to flow into the regulator chamber and the container until the first threshold value is achieved. In response to the differential pressure applied to the regulator being greater than the first threshold value between the container pressure and the environmental pressure, pressurized gas from the pressurized gas source is prevented from flowing into the regulator chamber and the container.

One embodiment of the present invention is directed to a container including an effervescent liquid and an effervescent liquid dispenser including pressurized gas from a pressurized gas source. A regulator is provided in selective fluid communication with the container and the pressurized gas source. In response to a differential pressure applied to the regulator being less than a first threshold value between a container pressure and an environmental pressure of an environment surrounding the dispenser, pressurized gas from the pressurized gas source is permitted to flow into the regulator chamber and the container until the first threshold value is achieved. In response to the differential pressure applied to the regulator being greater than the first threshold value between the container pressure and the environmental pressure, pressurized gas from the pressurized gas source is prevented from flowing into the regulator chamber and the container, and in which the liquid dispenser is permanently affixed to the container and the container is non-refillable.

One embodiment of the invention relates to any of the foregoing embodiments in which the pressurized gas source is located within the container.

One embodiment of the invention relates to any of the foregoing embodiments in which the pressurized gas source is located exterior to the container.

One embodiment of the invention relates to any of the foregoing embodiments in which the effervescent liquid dispenser is in fluid connection with a flexible tube.

One embodiment of the invention relates to any of the foregoing embodiments in which the effervescent liquid includes a carbonated alcoholic beverage.

One embodiment of the invention relates to any of the foregoing embodiments in which the container complies with 27 C.F.R. 5.46 (2017).

One embodiment of the invention relates to any of the foregoing embodiments in which the container conforms with 49 C.F.R. 173.306 (2017).

One embodiment of the invention relates to any of the foregoing embodiments in which the liquid dispenser is permanently affixed by compression fit.

One embodiment of the invention relates to any of the foregoing embodiments in which the liquid dispenser is permanently affixed by a crimp fit.

One embodiment of the invention relates to any of the foregoing embodiments in which the pressurized gas source is connected to the regulator.

One embodiment of the invention relates to any of the foregoing embodiment in which the pressure within the container ranges from about 2 to about 10 psi.

One embodiment of the invention relates to any of the foregoing embodiments in which a shaft extends through the dispenser and movement of the shaft permits pressurized gas from the pressurized gas source to flow which forces an effervescent liquid into a tube that in turn permits the effervescent liquid to pass through the dispenser and be dispensed from the container.

One embodiment of the invention relates to any of the foregoing embodiments further including a tap that is located externally to the dispenser and container and in which movement of the shaft is caused by rotational movement of a tap.

One embodiment of the invention relates to any of the foregoing embodiments further including a spout connected to the dispenser and in which the effervescent liquid is dispensed from the container from the spout.

The aspects and embodiments of the invention can be used alone or in combinations with each other.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 11 is an enlarged, partial cross-section taken along line 7-7 of the dispenser of FIG. 6.

FIG. 12 is an enlarged, partial view taken from region 12 of the dispenser of FIG. 11.

FIG. 17 is a cross-section of a dispenser having an internally located high pressure source and crimped dispenser attachment.

FIG. 18 is an enlarged partial cross-section of the dispenser of FIG. 17.

DETAILED DESCRIPTION OF THE INVENTION

Figure 1:
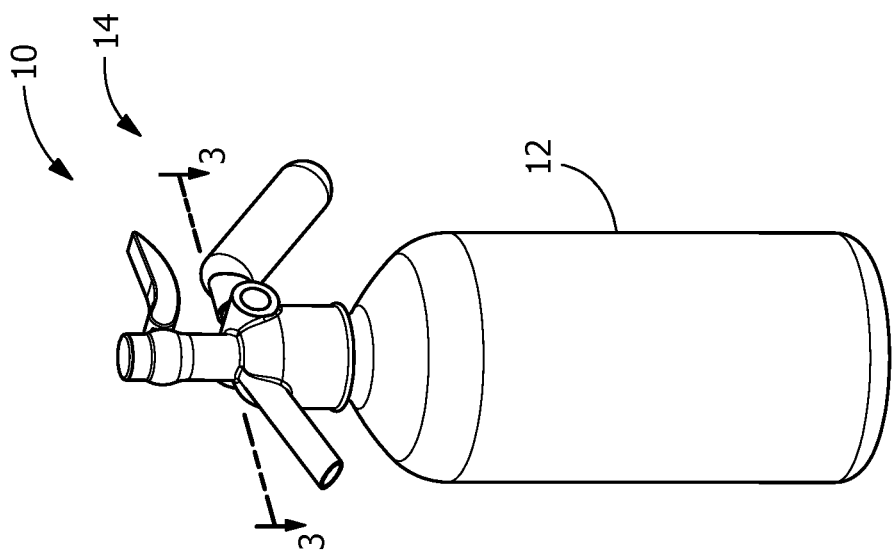
FIG. 1 is an upper front perspective view of an exemplary dispenser.

This invention provides an apparatus or a means, such as a dispenser, for dispensing a liquid as well as maintaining a uniform level of effervescence using a pressurized gas. This new invention is novel in that it provides a means for fully dispensing an effervescent fluid from a container without requiring high pressurization of the container itself. Unlike existing dispensers, the inventive dispenser is suitable for scale consumer products because it can be packaged in small form factors, manufactured in large quantities, and made at low costs. The device includes a vessel or high-pressure gas source for storing high-pressure gas, a regulator for maintaining low pressure inside the container, and a relief valve to ensure container pressure remains below a preselected threshold. The high-pressure gas source can be located internally or externally of the container. As just one example, existing alcoholic beverage packaging could be made safer by this invention without exceeding the headspace limitation imposed by law (e.g., the inventive dispenser is self-dispensing while employing a relatively low pressure within the container). Utilizing the novel dispenser of the present invention ensures the containers comply with current federal regulations, such as (49 C.F.R. § 173.306 (2017)) and (27 C.F.R. § 5.46 (2017)), while reducing the pressure level of pressurized gas in the container, while providing a container having improved safety in comparison to conventional dispensers. In particular, the instant invention permits substantially completely dispensing a carbonated beverage wherein the pressure within the container is less than 60 psi, for example, typically about 2 to about 20 psi, about 2 to about 10 psi and normally about 5 to about 6 psi. In another aspect of the invention, the pressure within the container ranges from about zero to about 300 psi.

The invention also provides a container having an effervescent fluid therein and having the dispenser permanently affixed to the container (e.g., an effervescent fluid is introduced into the container and sealed therein until it is desired to dispense the effervescent fluid from the container). The invention further provides a method for dispensing the entire contents of an effervescent fluid from a container under generally uniform pressure.

For purposes herein, "effervescent fluid" or "effervescent liquid" in accordance with the instant invention includes a fluid that becomes effervescent by being released from the inventive dispenser as well as a fluid that is carbonated prior to introduction into the dispenser. Examples of such fluids include carbonated or effervescent ales, colas, fruit drinks, teas, waters, sodas, soft drinks, among other beverages as well as alcoholic beverages such as gin, liqueurs, vodka, rum, champagne, sparkling wine, among other alcoholic beverages. While any suitable degree of effervescence or carbonation can be employed, the fluid can comprise about 1 to about 10 volumes, about 2 to about 8 and normally about 2 to 3 volumes of gas.

The instant invention further provides for a method for introducing an effervescent liquid into the container.

The instant invention further provides a method for dispensing an effervescent fluid from the container.

Figure 3:
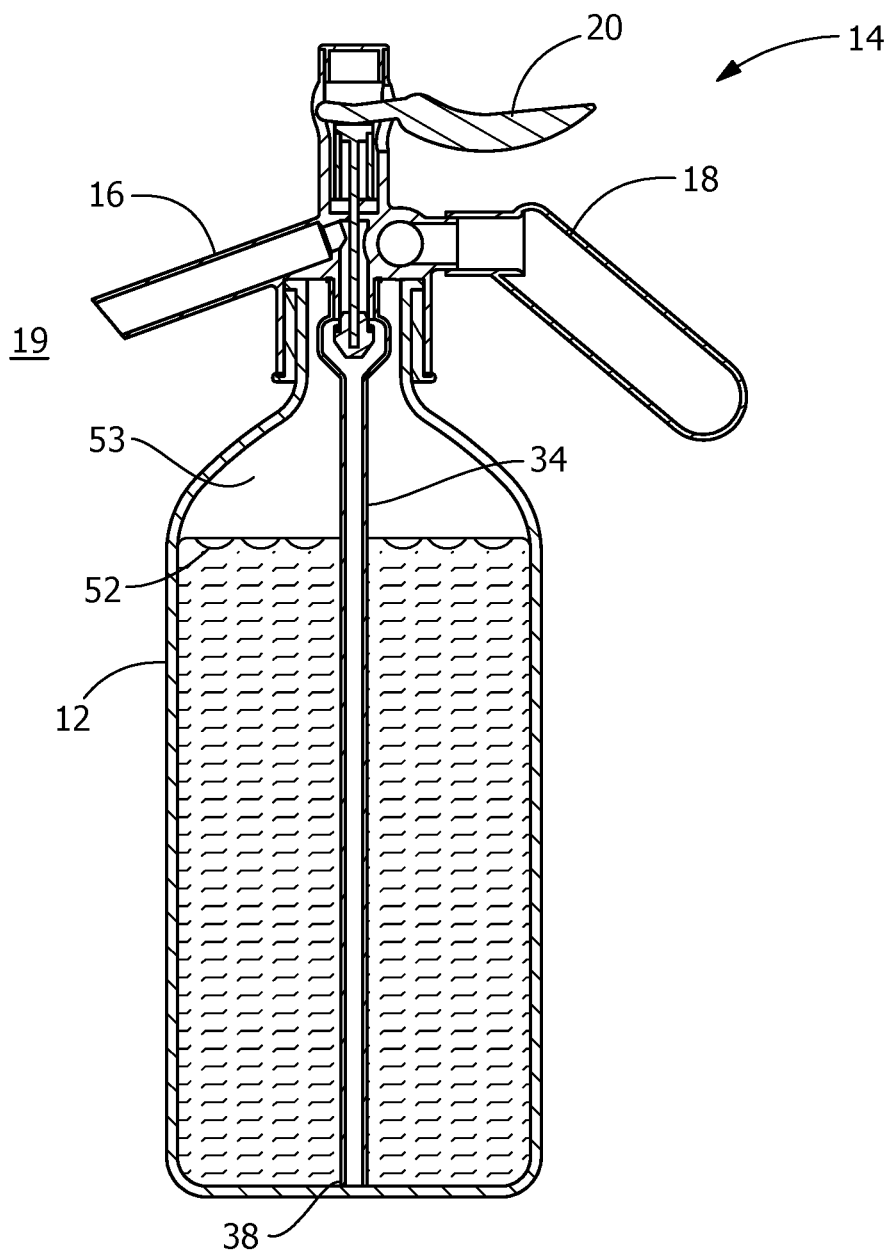
FIG. 3 is a cross-section of the dispenser FIG. 1.

For purposes herein, headspace, such as headspace 53 shown in FIG. 3, is defined as the distance from the top of the container to the top of a product, which in this case is to the top of pressurized liquid 52.

Figure 2:
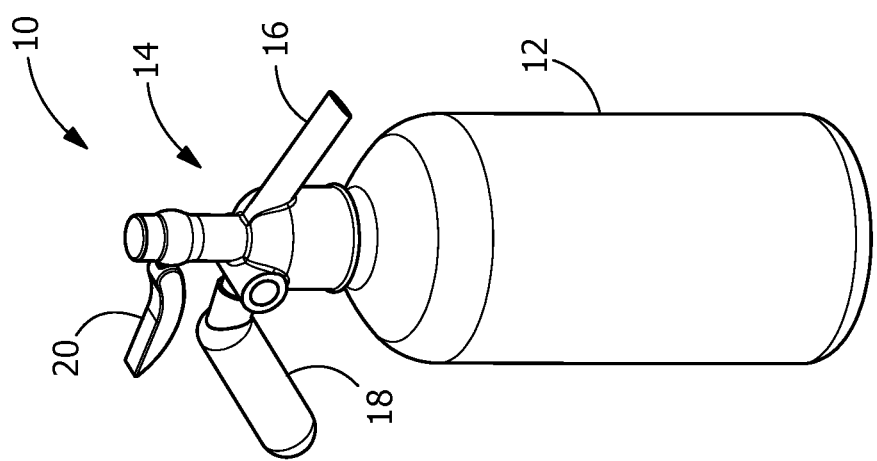
FIG. 2 is a rotated front perspective view of the dispenser of FIG. 1.

FIGS. 1 and 2 show one embodiment of an exemplary dispenser 10 including a container 12 having a collar 58 (FIG. 5) that is secured to a dispenser assembly 14. Dispenser assembly 14 includes a high-pressure vessel or high-pressure source 18 that provides pressurized gas, such as carbon dioxide, nitrogen, among others, to a liquid contained in container 12, which liquid is or becomes a pressurized liquid 52 (FIG. 3). A portion of the pressurized gas can dissolve in pressurized liquid 52 such that upon the pressurized liquid 52 being discharged from a spout 16 into an ambient environment 19 (FIG. 5) surrounding the dispenser, pressurized liquid 52 becomes effervescent liquid 56. When a previously carbonated effervescent fluid is to be dispensed, the pressurized gas maintains a pressure upon the effervescent fluid thereby maintaining the effervescence and permitting the effervescent fluid to be dispensed at a generally uniform pressure.

It is to be understood that any suitable high-pressure gas that promotes or maintains effervescence may be used.

Figure 4:
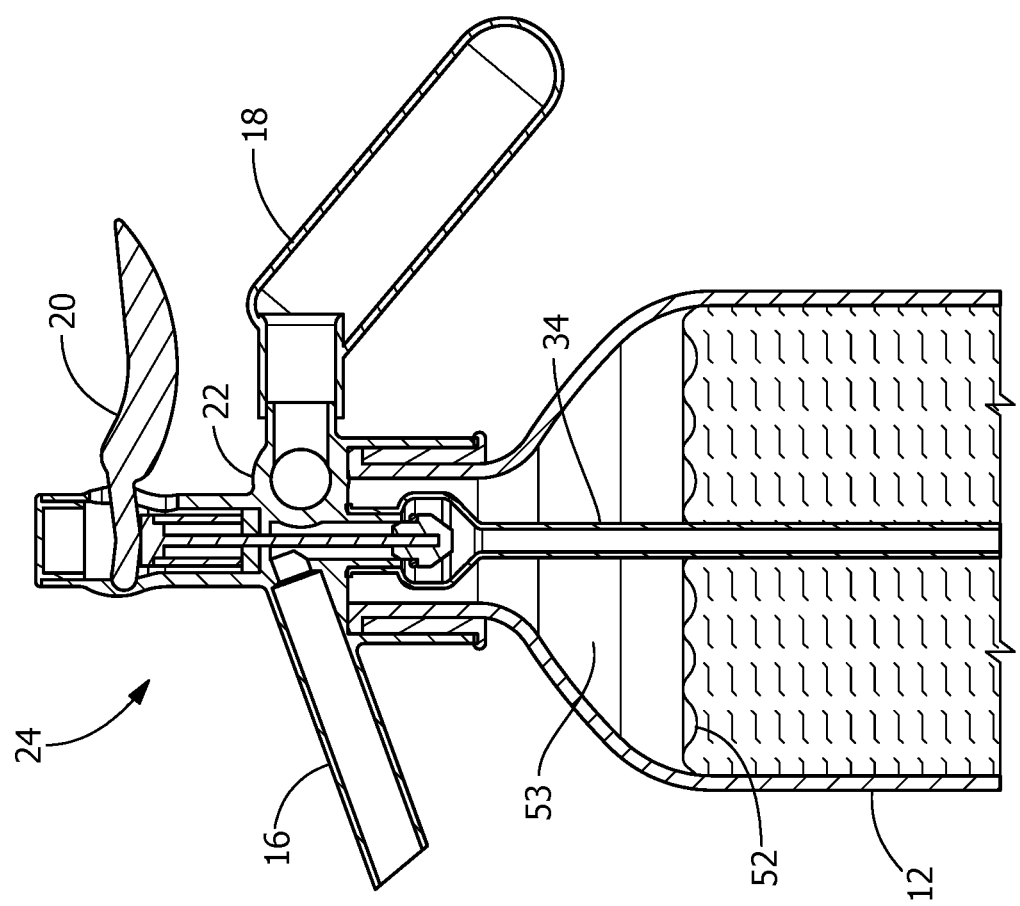
FIG. 4 is an enlarged, partial cross-section of the dispenser of FIG. 3.
Figure 5:
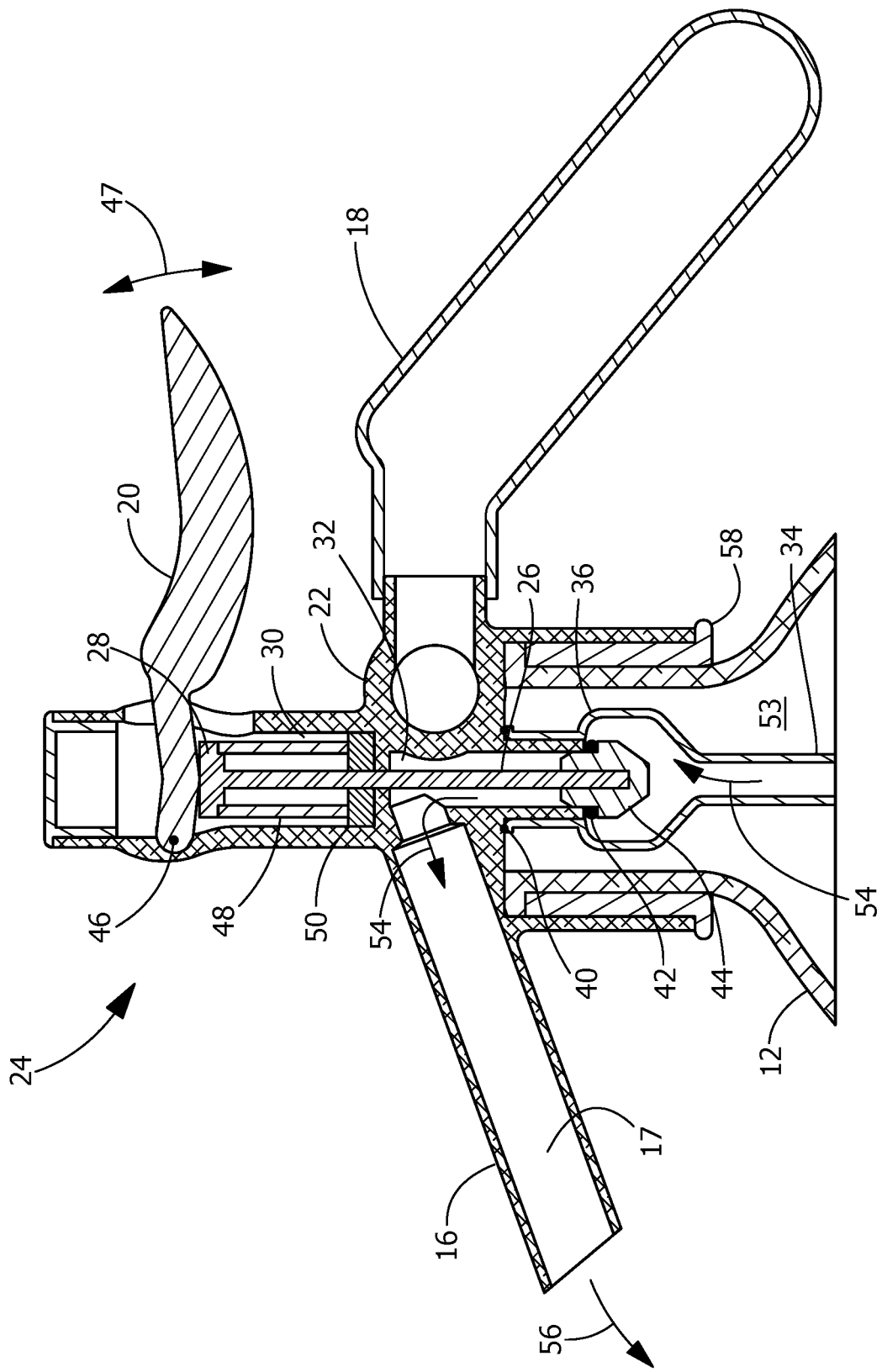
FIG. 5 is a further enlarged, partial cross-section of the dispenser of FIG. 4.

As shown in FIGS. 4 and 5, the dispenser assembly 14 includes a dispensing mechanism 24 including a dispenser body 22. An enlarged portion 36 of a straw or tube 34 is secured to dispenser body 22. An O-ring 40 promotes a fluid tight seal between enlarged portion 36 and dispenser body 22. Tube 34 extends to an opposed end 38 (FIG. 3) positioned near the bottom of container 12 for selectively forcibly directing pressurized liquid 52 through tube 34, then through dispenser body 22 before being discharged from spout 16. Dispenser assembly 14 is permanently affixed to container 12 by any suitable means such as press-fit, crimp, rolled flange, retaining rings and snaps, among other permanent attachment means and methods (for example, as described in greater detail in connection with FIGS. 17-21). In particular, since the dispenser assembly 14 is permanently affixed to container 12, container 12 is intended to be discarded, recycled or otherwise disposed of after dispensing the effervescent liquid is complete.

As further shown in FIG. 5, a lever or tap 20 rotates in a rotational movement 47 about a pivot 46 formed in dispenser body 22. Tap 20 abuts a head 28 of a fluid shaft 26, which head 28 is positioned in a passageway 30 of dispenser body 22. Head 28 extends to a fluid shaft 26. Fluid shaft 26 passes through a fluid tight opening formed in a fluid shaft seal 50 and extends through a passageway 32 formed in dispenser body 22, terminating in a plug or valve member 44 positioned in enlarged portion 36 of tube 34. Valve member 44 includes an O-ring 42 for providing a fluid tight seal between valve member 44 and dispenser body 22 when valve member 44 is in a closed position such as shown in FIG. 5.

As further shown in FIG. 5, a spring 48 is positioned between fluid shaft seal 50 and head 28 of fluid shaft 26. By virtue of spring 48, head 28 biases and urges tap 20 in rotational movement 47 away from high-pressure source 18, and urging valve member 44 into its closed position in contact with dispenser body 22.

As shown in FIG. 5, in order to dispense pressurized fluid 52 (FIG. 3), a sufficient force is applied to tap 20 in rotational movement 47 toward high-pressure source 18 to overcome the opposing force generated by spring 48. When the opposing force generated by spring 48 is overcome, fluid shaft 26 is urged toward enlarged portion 36 of tube 34, similarly urging valve member 44 to an open position. With valve member 44 in an open position, pressurized liquid 52 (FIG. 3) which is pressurized to a higher pressure than the environmental or ambient environment 19 is urged into pressurized liquid flow 54 through tube 34, then through enlarged portion 36, then through passageway 32 and finally through passageway 17, whereupon the pressurized liquid is discharged into ambient environment 19. Upon being discharged into ambient environment 19, pressurized liquid 52 becomes effervescent liquid 56, due to effervescence occurring as a result of the reduction of pressure level in the ambient environment compared to the pressure level in container 12. In the event the pressurized liquid 52 comprises a previously carbonated effervescent liquid, then the effervescent liquid 56 has a degree of carbonation substantially the same as when the carbonated liquid was introduced into container 12.

Figure 7:
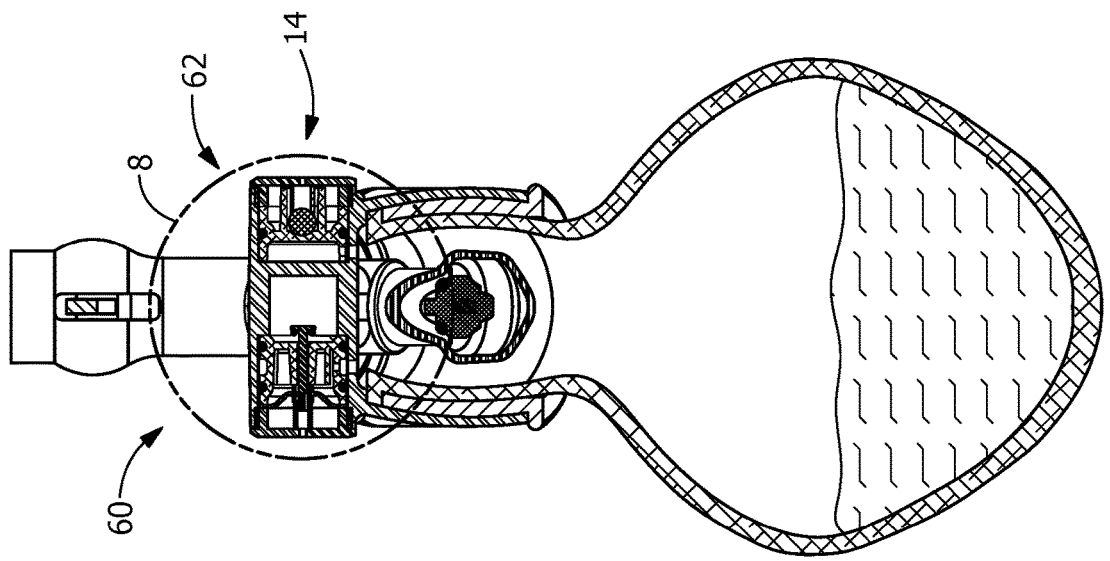
FIG. 7 is a cross-section taken along line 7-7 of the dispenser of FIG. 6.
Figure 6:
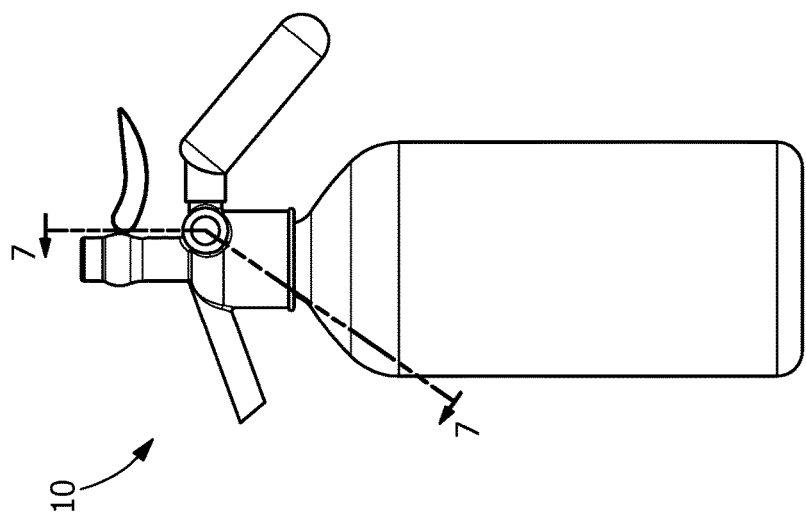
FIG. 6 is a side elevation view of an exemplary dispenser.
Figure 8:
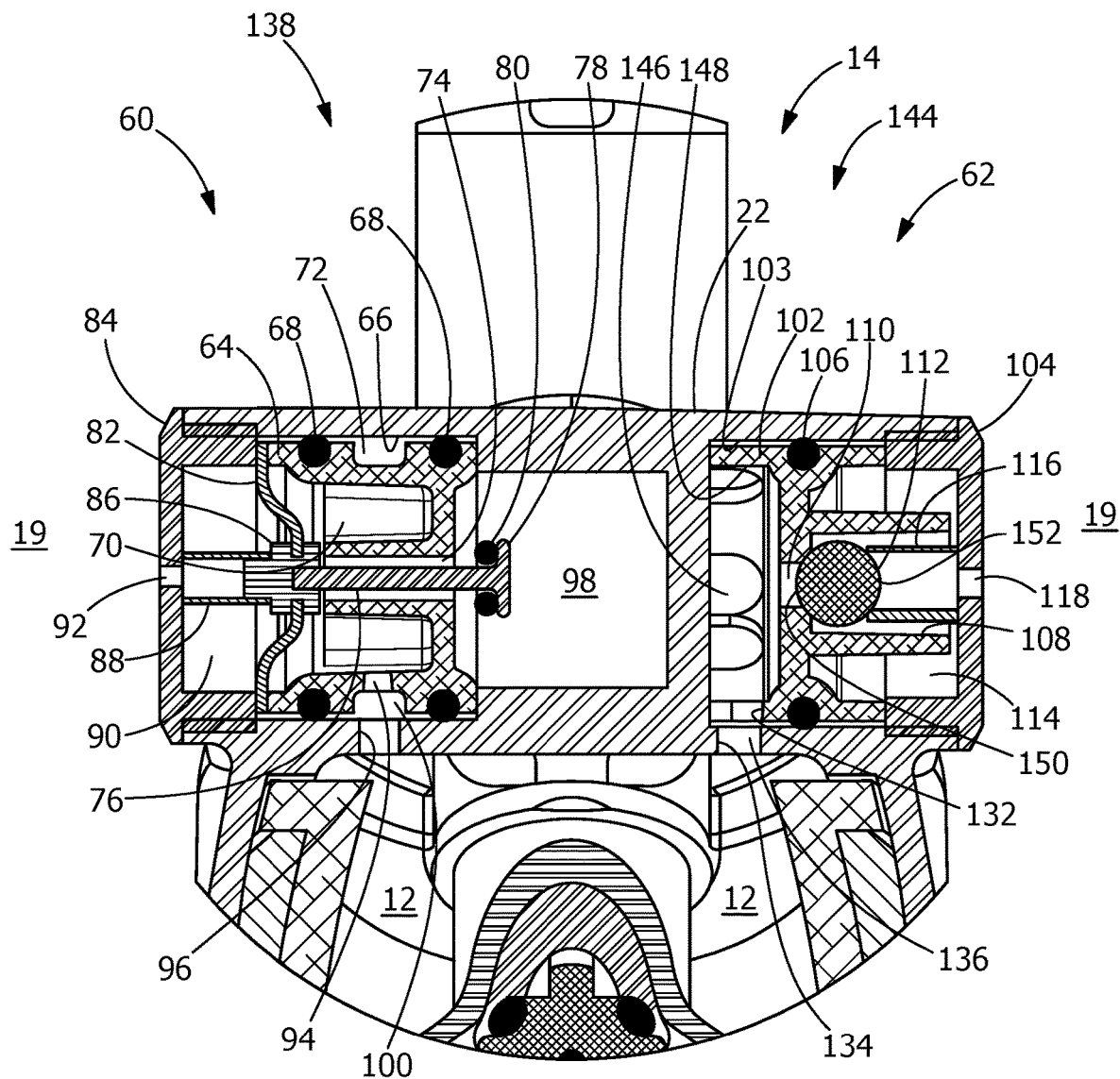
FIG. 8 is a further enlarged, partial cross-section taken from region 8 of the dispenser of FIG. 7.

As shown in FIGS. 6-10, the dispenser includes a regulator 60 and an optional pressure relief valve 62 incorporated into dispenser assembly 14. FIG. 7 is a cross-section of the dispenser taken along line 7-7 of FIG. 6, and FIG. 8 is a further enlarged, partial cross-section taken from region 8 of the dispenser of FIG. 7. As further shown in FIG. 8, regulator 60 includes a regulator frame or regulator body or body 64 that is inserted inside of a passageway 66 of dispenser body 22. A diaphragm 82 is positioned to one side of regulator body 64 opposite a chamber 98 formed in dispenser body 22 in fluid communication with high-pressure source 18. In other words, chamber 98 and high-pressure source 18, but not diaphragm 82 and high-pressure source 18, are in continuous fluid communication. Regulator body 64 and diaphragm 82 are secured between dispenser body 22 and a cap 84. Regulator body 64 includes an internal channel, such as an annular recess 70 in fluid communication with diaphragm 82 and a circumferential groove 72 in fluid communication with passageway 66. Regulator body 64 further includes a passageway 74 formed therethrough in selective fluid communication with chamber 98, annular recess 70, and diaphragm 82. Additionally, by virtue of opening 94 formed in circumferential groove 72 of regulator body 64 and an opening 96 formed in dispenser body 22 being aligned with each other, cumulatively forming a passageway 100, annular recess 70 is in fluid communication with container 12. Such alignment need not be exact but sufficient to permit the fluid communication.

Figure 14:
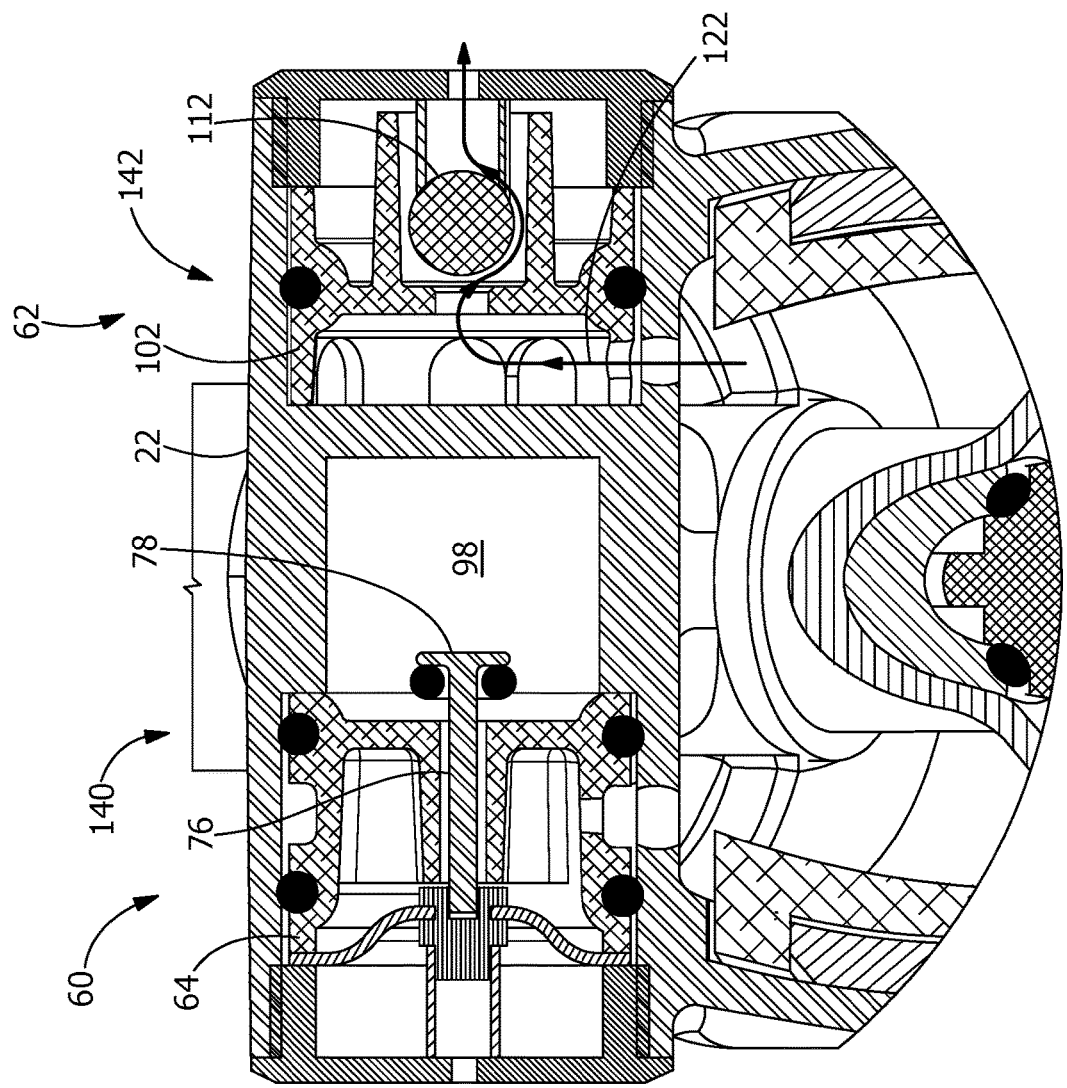
FIG. 14 is an enlarged, partial view taken from region 13 of the dispenser of FIG. 13.

As further shown in FIG. 8, diaphragm 82 includes a centrally positioned diaphragm member 86. One end of a spring 88 abuts a counterbore 90 formed in cap 84. The other end of spring 88 contacts and biases diaphragm member 86 toward regulator body 64. Diaphragm member 86 is secured to one end of a plunger 76 that extends through passageway 74 of regulator body 64, terminating at a head 78 which is in fluid communication with chamber 98. In other words, head 78 and chamber 98 are in continuous fluid communication, and likewise, chamber 98 and high-pressure source 18 are in continuous fluid communication. O-ring 80 associated with head 78 establishes a fluid tight seal with regulator body 64 when the regulator is in a closed position 140 (FIG. 14).

Figure 10:
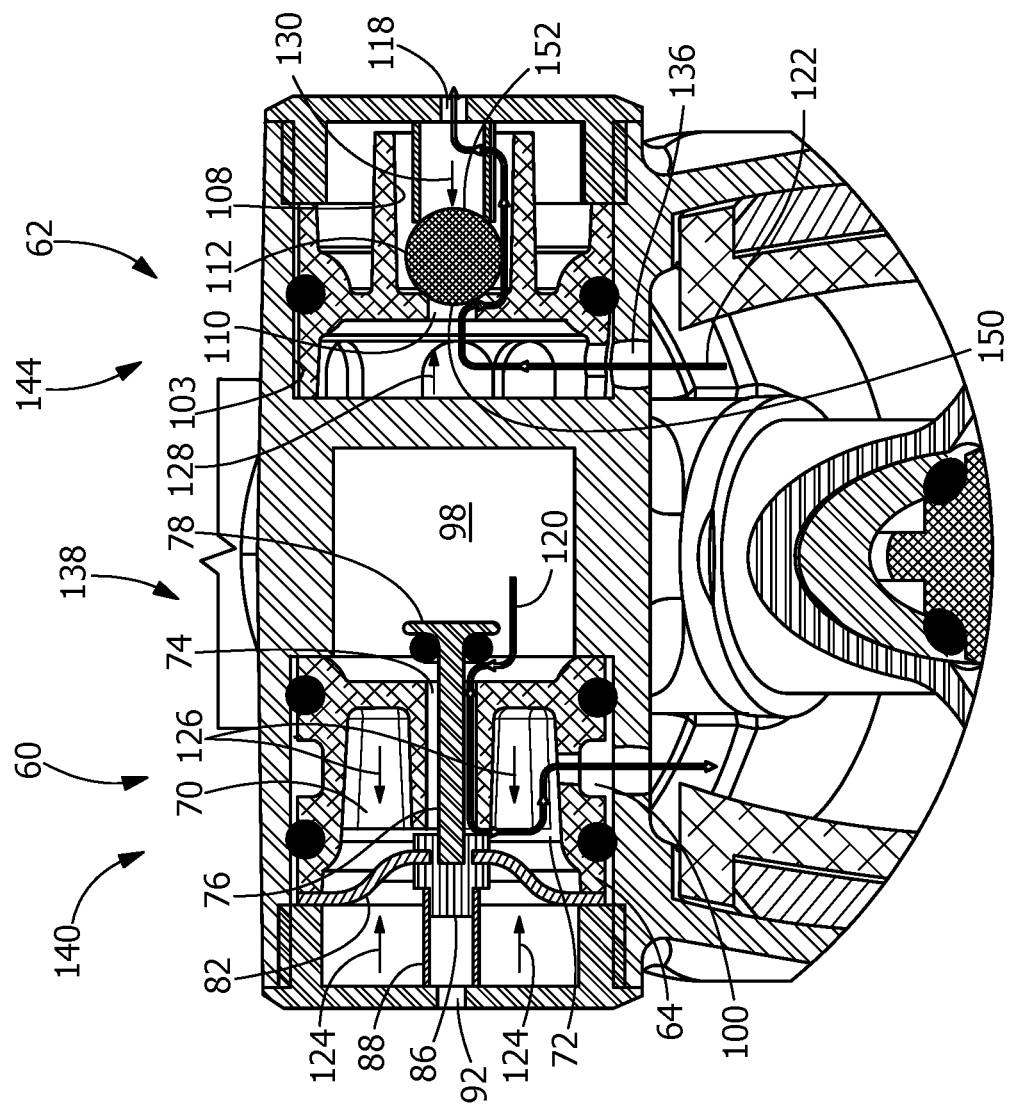
FIG. 10 is an enlarged view taken from region 10 of the dispenser of FIG. 9.
Figure 9:
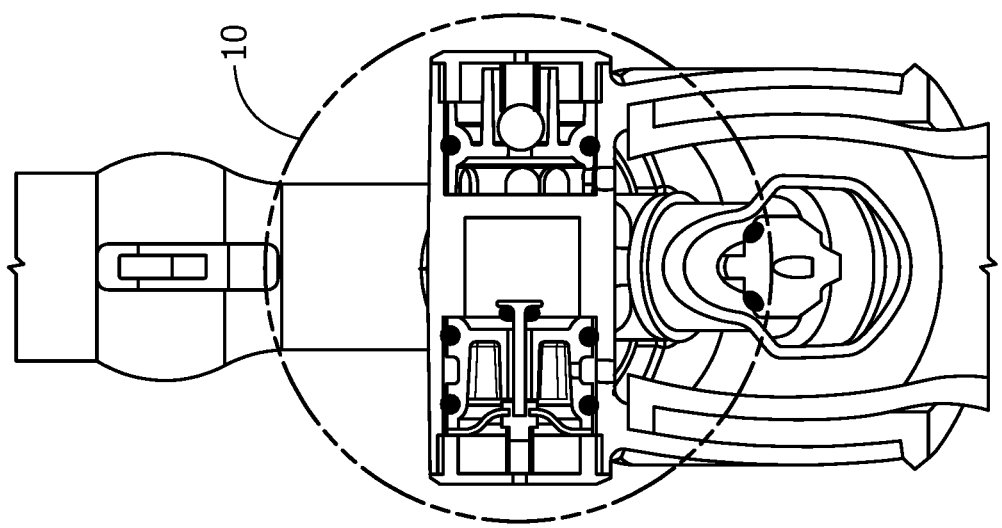
FIG. 9 is a cross-section taken along line 7-7 of the dispenser of FIG. 6.

As shown in FIGS. 6, 9 and 10, in which FIG. 9 is a cross-section of the dispenser taken along line 7-7 of FIG. 6, and FIG. 10 is a further enlarged, partial cross-section taken from region 10 of the dispenser of FIG. 9, the operation of regulator 60 is now discussed. As further shown FIG. 10, diaphragm 82 is subjected to opposed forces 124, 126. Force 124 corresponds to ambient pressure applied to the surface of diaphragm 82 facing cap 84 by virtue of opening 92, as well as an additional force applied to diaphragm member 86 by spring 88 (e.g., an additional force to maintain or retain a defined position). Force 126 corresponds to the pressure level in container 12. In response to force 124 being greater than force 126, diaphragm member 86 of diaphragm 82 is urged to move toward chamber 98 which similarly urges head 78 of plunger 76 away from regulator body 64, resulting in the regulator being in an open position 138.

As further shown in FIG. 10, while the regulator is in an open position 138, a high-pressure gas flow path 120 is established, in which high-pressure gas in chamber 98 from high-pressure source 18 (FIG. 1) sequentially flows between head 78 of plunger 76 and regulator body 64, then through passageway 74, then through annular recess 70 and finally through passageway 100 into container 12, increasing the pressure level in container 12, and likewise, increases force 126 applied to diaphragm 82. Once force 126 exceeds force 124, diaphragm member 86 of diaphragm 82 is urged to move away from chamber 98, similarly moving head 78 of plunger 76 toward and into a fluid tight contact with regulator body 64, resulting in the regulator being in a closed position 140 (FIG. 14). As a result, the regulator prevents over-pressurization of the container while maintaining the pressure in the container at a generally constant level, resulting in a uniform level of effervescence.

As shown in FIGS. 6-10, optional pressure relief valve 62 is incorporated into dispenser assembly 14. FIG. 7 is a cross-section of the dispenser taken along line 7-7 of FIG. 6, and FIG. 8 is a further enlarged, partial cross-section taken from region 8 of the dispenser of FIG. 7. As further shown in FIGS. 8 and 10, pressure relief valve 62 includes a relief valve frame or relief valve body or valve body 102 that is inserted inside of a passageway 103 of dispenser body 22. Valve body 102 is secured between dispenser body 22 and a cap 104. An O-ring 106 provides a fluid tight seal between dispenser body 22 and valve body 102. Cap 104 includes a counterbore 114 and an opening 118 in fluid communication with ambient environment 19. Valve body 102 includes a counterbore 108 having an opening 110 facing dispenser body 22.

As further shown in FIGS. 8 and 10, a valve member 112 is positioned inside of counterbore 108 between opening 110 on one side of valve member 112 and a spring 116 on the other side of the valve member. Spring 116 is positioned between valve member 112 and counterbore 114. When pressure relief valve 62 is in a closed position 144, Valve member 112 abuts and is in fluid tight contact with opening 110. A counterbore 146 having a peripheral sidewall 148 is in fluid communication with opening 110. Peripheral sidewall 148 has an opening 132 formed therethrough that is aligned with an opening 134 formed in dispenser body 22. Cumulatively, openings 132, 134, form a passageway 136 that is in communication with container 12.

Figure 13:
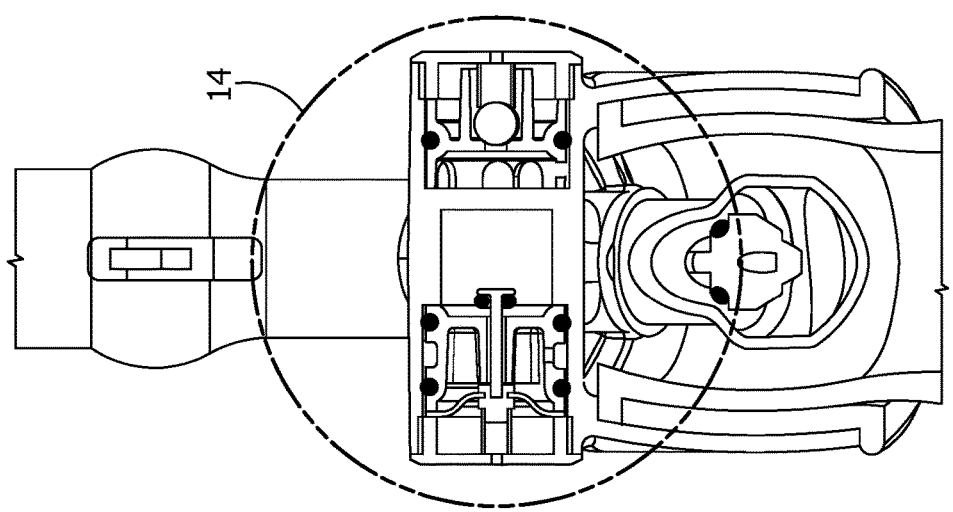
FIG. 13 is an enlarged, partial cross-section taken along line 7-7 of the dispenser of FIG. 6.

As shown in FIGS. 6 and 8-14, in which FIGS. 11 and 13 are cross-sections of the dispenser taken along line 7-7 of FIG. 6, FIG. 12 is a further enlarged, partial cross-section taken from region 12 of the dispenser of FIG. 11, and FIG. 14 is a further enlarged, partial cross-section taken from region 12 of the dispenser of FIG. 13, the operation of pressure relief valve 62 is now discussed. A container-facing side 150 of the valve member 112 faces opening 110 of valve body 102, and an environment-facing side 152 of valve member 112 faces cap 104 which is in fluid communication with ambient environment 19 via opening 118. Container-facing side 150, which is a fluid communication with container 12 via passageway 136 and opening 110 is subjected to a force 128. Force 128 is a product of the surface area of opening 110 multiplied by the pressure level of container 12. Environment-facing side 152 is subjected to a force 130, which is the sum of two force components: the first force component is the product of the surface area of environment-facing side 152 multiplied by the pressure of ambient environment 19; the second force component is the force applied by spring 116.

When force 128 is less than force 130, valve member 112 is urged into a fluid tight contact with opening 110, defining a closed position 144 (FIG. 8) of pressure relief valve 62. However, when force 128 is greater than force 130, valve member 112 is urged away from opening 110, defining an open position 142 (FIG. 14) of pressure relief valve 62. In open position 142, a vented pressurized gas flow path 122 is established, in which pressurized gas from container 12 flows through passageway 136, through opening 110, around valve member 112 before being discharged from the pressure relief valve via opening 118 into the ambient environment. As a result, the pressure relief valve prevents over-pressurization of the container, in the event the regulator does not function properly.

Figure 16:
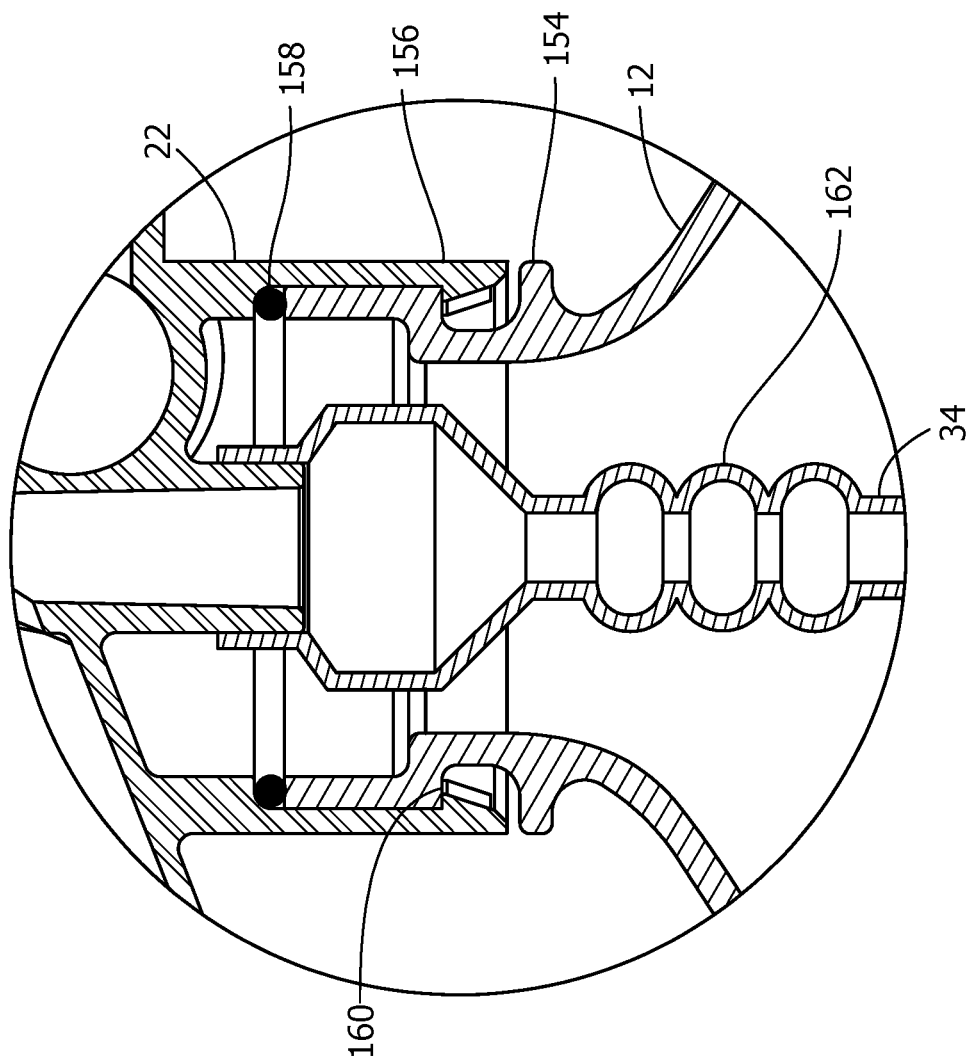
FIG. 16 is an enlarged, partial view taken from region 16 of the dispenser of FIG. 15.
Figure 15:
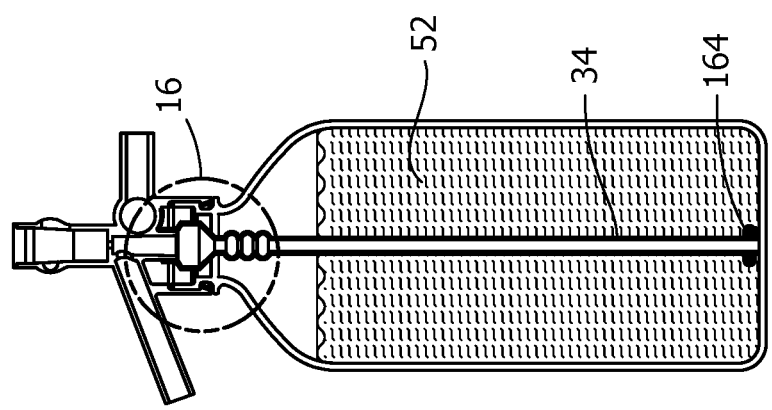
FIG. 15 is a side elevation of one embodiment of an exemplary dispenser.

FIGS. 15 and 16 show further embodiments of the invention. FIG. 16 shows an enlarged area 16 of FIG. 15. Referring now to FIG. 16, FIG. 16 shows one embodiment of the invention wherein dispenser body 22 is compression or snap-fit onto container 12. In this embodiment, container 12 includes a protuberance 154 and an outwardly extending ridge 160. Dispenser body 22 includes a tab 156 wherein upon application of a downward force, tab 156 flexes outwardly when traveling past ridge 160 and then tab 156 returns to its original shape and engages ridge 160 thereby creating a compression or snap fit connection between dispenser body 22 and container 12. An O-ring 158 or other suitable fluid tight means is position between the opening of container 12 and dispenser body 22.

Referring now to FIG. 15, FIG. 15 shows another embodiment of the invention wherein straw or siphon tube 34 is flexible. In this embodiment of the invention, tube 34 includes bellows 162 that allows the tube 34 to flex and move within container 12. Tube 34 further includes a weight 164 that causes the tube 34 to flex in response to movement of the container 12. In particular, a flexible tube 34 can enhance the entire quantity of pressurized fluid 52 being dispensed from the container 12.

One aspect of the invention relates to a method to deactivate the regulator such that the container can be precharged to any pressure through the high pressure vessel and the pressure released or deactivated to a predetermined lower pressure. One method for reducing pressure within the container comprises pushing the regulator "open" using a small shaft through a hole in the regulator cap. The container could then be precharged by adding gas through the high pressure vessel until the desired container precharge pressure is reached. For example, by pushing member 86 (FIG. 10) with a "pin" through opening 92, air can flow freely between container 12 and high-pressure source or pressure vessel 18. The regulator 60 is forced "open". This enables one to fill the pressure vessel with compressed gas after the inventive dispenser has been assembled. If desired, one can pressurize the bottle or container to a different pressure than the pressure vessel. With pin engaged (regulator forced "open") gas can be added to pressure vessel 18 and therefore container 12. The flow of pressurized gas is maintained until the container reaches the desired pressure (e.g., less than 60 psi and typically less than 50 psi). The pin is then retracted (regulator closed) and the pressure vessel can be filled until a desired pressure (e.g., 300 psi) is reached. As a result, the container be maintained at a pressure that is less than the pressure of the pressure vessel (e.g., the container has a pressure of 50 psi and the pressure vessel is at 300 psi).

Another aspect of the invention relates to a method that allows one to fill the pressure vessel and bottle or container to the same pressure. With pin engaged (regulator forced "open") gas is added through the nozzle 16 which increases the pressure in the container 12 and the pressure vessel 18. The container and pressure vessel can be pre-charged to any desired pressure. This method is useful for applications where an initial fluid pressurization is required until the first dispense, at which point the gas flow would be regulated.

As shown in FIGS. 17-21 and in one embodiment of the invention, the high pressure source is located within container 12. A high pressure source 170 is located within container 12 and in fluid connection with a pressure regulator having regulator body 64. The pressure regulator functions in the manner described above in connection with FIGS. 6-10. O-rings or other suitable arrangement 186 provides a fluid seal between high pressure gas source 170 and the regulator body. In particular, when tap 20 is urged into rotational movement, fluid shaft 168 is displaced thereby allowing a pressure to be applied by pressure source 170 through the regulator body which causes fluid 52 to pass through tube or straw 34 and in turn be dispensed via passageway 17.

Referring now to FIG. 18, FIG. 18 shows one embodiment of the invention wherein a dispenser body 166 is permanently affixed to container 12 by using a crimp system 178. Container 12 includes an outwardly extending protuberance 180 that includes a face that engages a matching face on flange 182 of dispenser body 166. Container 12 further includes a compression fit cap or clevis 174 that is affixed to regulator body 64 wherein the regulator body 64 sealingly engages the container 12 by O-rings or other suitable arrangement 184. The interior circumference of dispenser body 166 further defines a groove 176 that engages the distal portion of cap 174. In particular, when a downward force is applied onto dispenser body 166, cap 174 is compressed inwardly until the distal portion of cap 174 expands outwardly ("snaps") and engages groove 176 thereby permanently affixing dispenser body 166 onto container 12. If desired, exterior circumferential portions of matching faces of protrusion 180 and flange 182 can be crimped by using crimp system 178. The crimp system can comprise a ring, foil or other flexible system that is shaped in order to be permanently affixed to the matching faces of protrusion 180 of dispenser body 166 and flange 182 of container 12.

Figure 19:
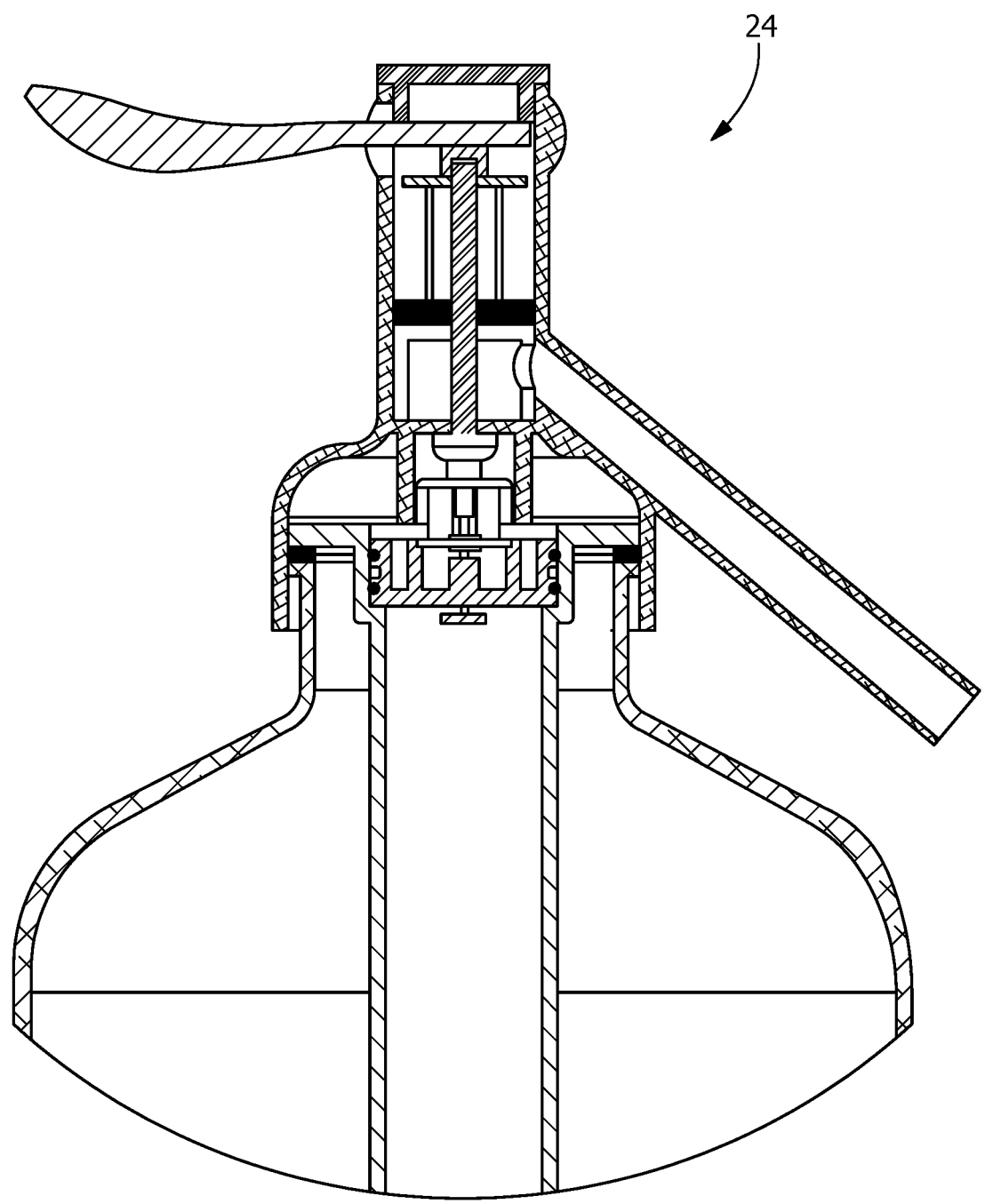
FIG. 19 is a cross-section of a dispenser having an internally located high pressure source and crimped dispenser attachment.
Figure 20:
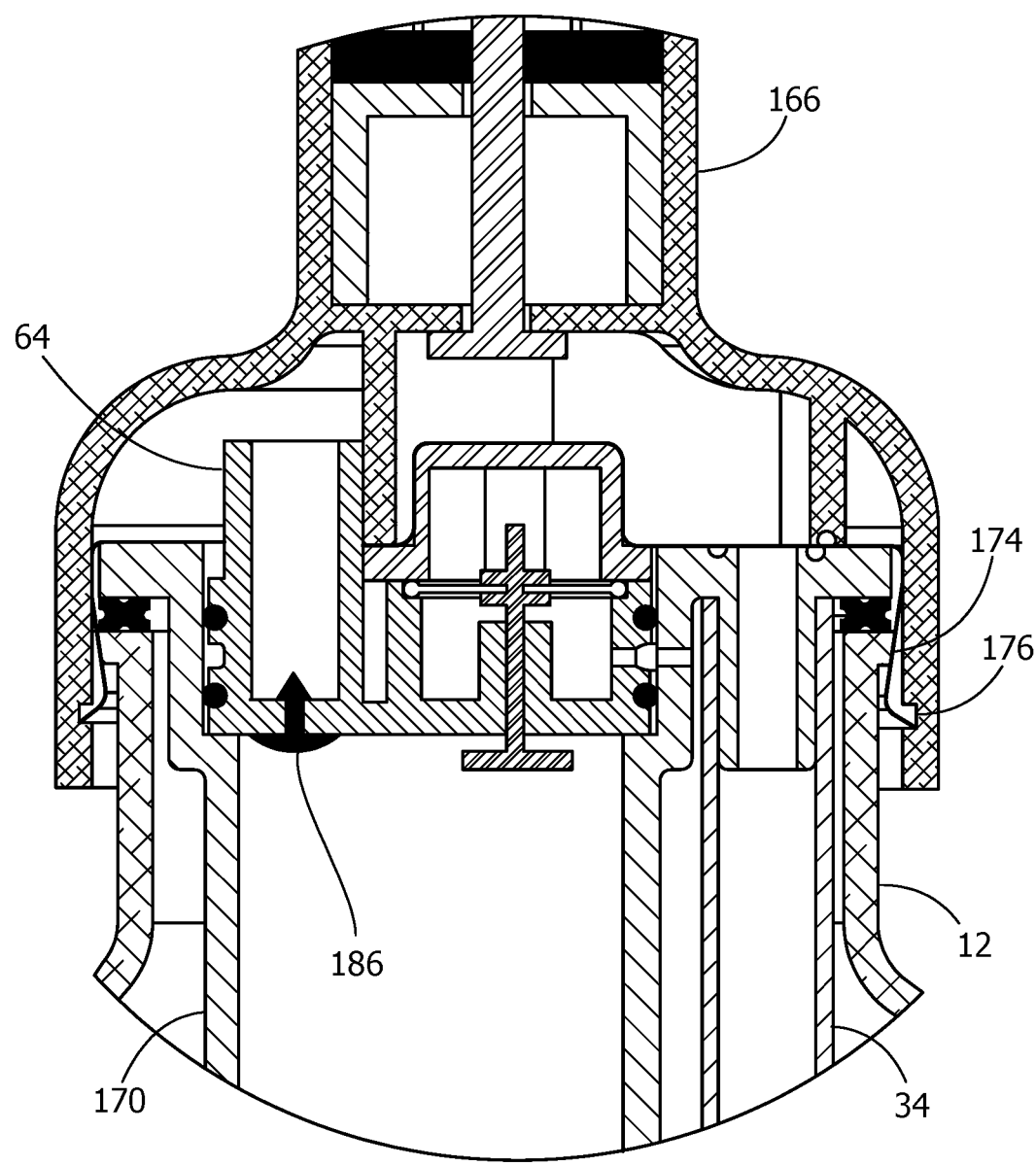
FIG. 20 is an enlarged partial cross-section of one embodiment of the dispenser of FIG. 19.

Referring now to FIG. 20, FIG. 20 shows an embodiment of a dispenser of FIG. 19 wherein a plug 186 is located in regulator body 64. Plug 186 can be used for introducing or removing a gas from pressure source 170.

Figure 21:
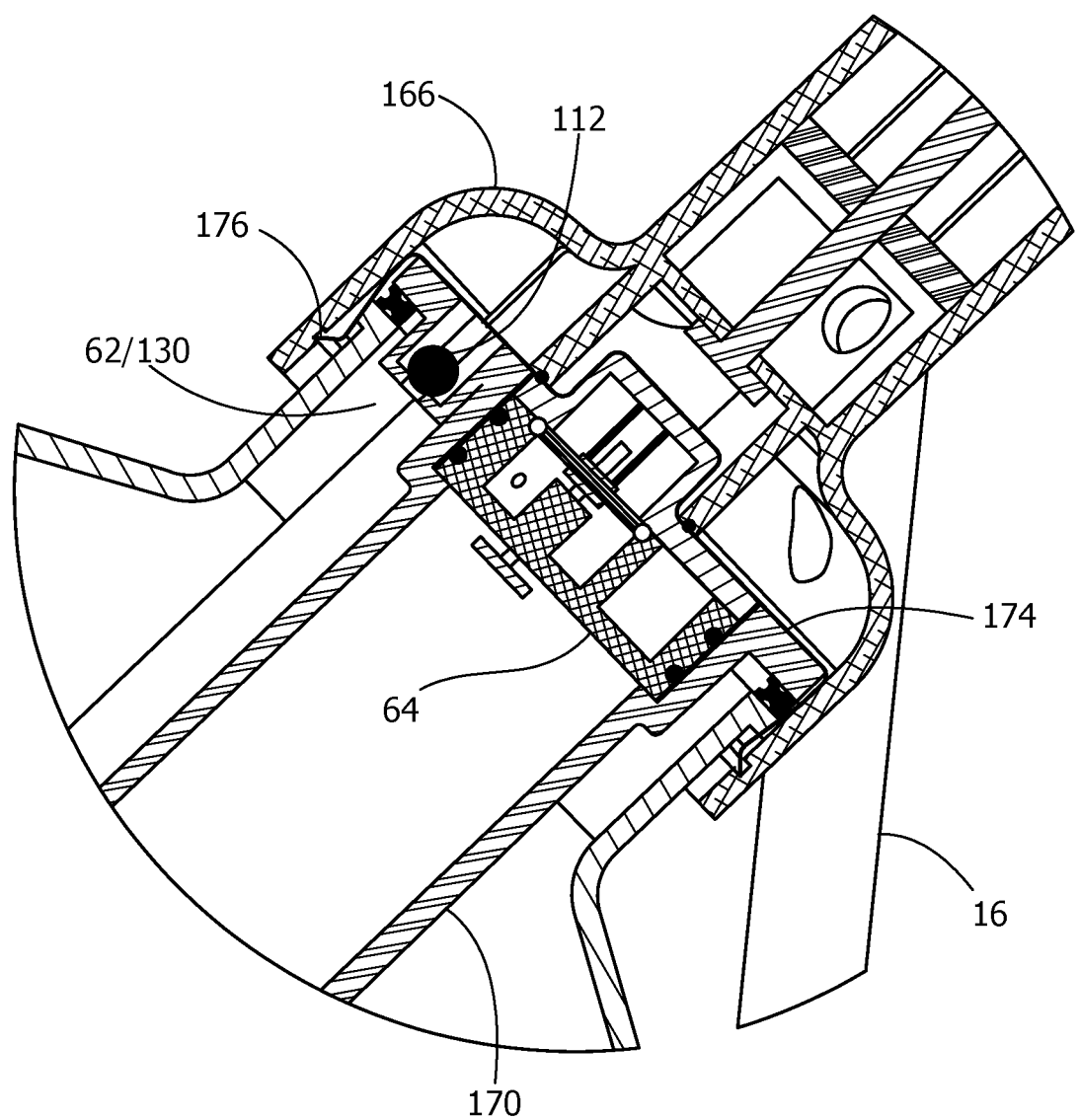
FIG. 21 is a further enlarged partial cross-section of the dispenser of FIG. 19.

Referring now to FIG. 21, FIG. 21 shows an embodiment of a dispenser of FIG. 19 that further includes a pressure relief value 62 that employs valve member 112 and operates in the manner described above in connection with FIG. 8.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An effervescent liquid dispenser comprising:
   a dispenser body;
   pressurized gas from a pressurized gas source connected to the dispenser body;
   wherein the dispenser is adapted for connection to a container containing liquid to be dispensed receiving pressurized gas from the pressurized gas source, becoming a pressurized liquid, the pressurized liquid becoming an effervescent liquid upon being dispensed from the container, the dispenser including a fluid shaft in a passageway and a valve member, the fluid shaft being arranged along a length of the passageway, the fluid shaft and valve member being adapted to release pressurized liquid upon urging of the valve member into an open position; and a regulator connected to the dispenser body and in selective fluid communication with the container and the pressurized gas source, the regulator and the dispenser body being configured as a unitary assembly that permits selective passage of pressurized gas and pressurized liquid;

a tube connected to the dispenser body and extending into the container;

a spout connected to the dispenser body for discharging the pressurized liquid;

wherein in response to a differential pressure applied to the regulator being less than a first threshold value between a container pressure and an environmental pressure of an environment surrounding the dispenser, pressurized gas from the pressurized gas source is permitted to flow into the regulator chamber and the container until the first threshold value is achieved;

wherein in response to the differential pressure applied to the regulator being greater than the first threshold value between the container pressure and the environmental pressure, pressurized gas from the pressurized gas source is prevented from flowing into the regulator chamber and the container;

wherein the liquid dispenser is permanently affixed to the container and the container is non-refillable.

2. The dispenser of claim 1 further comprising a pressure relief valve spaced apart from the regulator, the pressure relief valve having a valve member in fluid communication with the container on one side of the valve member and in fluid communication with an environment surrounding the dispenser on the other side of the valve member;

wherein in response to a first force applied to the container-facing side of the valve member exceeding a second force applied to the environment-facing side of the valve member, the valve member is actuated to an open position for discharging pressurized gas from the container into the environment;

wherein in response to the first force applied to the container-facing side of the valve member being less than the second force applied to the environment-facing side of the valve member, the valve member is actuated to a closed position for preventing pressurized gas discharge from the container into the environment.

3. A container comprising an effervescent liquid and an effervescent liquid dispenser, the dispenser comprising:

a pressurized gas source connected to the dispenser; and a regulator connected to the dispenser and in selective fluid communication with the container and the pressurized gas source, the regulator and the dispenser being configured as a unitary assembly that permits selective passage of pressurized gas and pressurized liquid;

a tube connected to the dispenser and extending into the container;

a spout connected to the dispenser for dispensing the effervescent liquid;

a fluid shaft in a passageway and a valve member, the fluid shaft being arranged along a length of the passageway, the fluid shaft and valve member being adapted to release pressurized liquid upon urging of the valve member into an open position;

wherein in response to a differential pressure applied to the regulator being less than a first threshold value between a container pressure and an environmental pressure of an environment surrounding the dispenser, pressurized gas from the pressurized gas source is permitted to flow into the regulator chamber and the container until the first threshold value is achieved;

wherein in response to the differential pressure applied to the regulator being greater than the first threshold value between the container pressure and the environmental pressure, pressurized gas from the pressurized gas source is prevented from flowing into the regulator chamber and the container;

wherein the liquid dispenser is permanently affixed to the container and the container is non-refillable.

4. The container of claim 3 wherein the effervescent liquid comprises a carbonated alcoholic beverage.

5. The container of claim 3 wherein the container complies with 27 C.F.R. 5.46 (2017).

6. The container of claim 5 wherein the container conforms with 49 C.F.R. 173.306 (2017).

7. A container comprising an effervescent liquid and an effervescent liquid dispenser comprising:

pressurized gas from a pressurized gas source; and a regulator connected to the dispenser and in selective fluid communication with the container and the pressurized gas source, the regulator and the dispenser being configured as a unitary assembly that permits selective passage of pressurized gas and pressurized liquid;

a tube connected to the dispenser and extending into the container;

a spout connected to the dispenser for dispensing the effervescent liquid;

a fluid shaft in a passageway and a valve member, the fluid shaft being arranged along a length of the passageway, the fluid shaft and valve member being adapted to release pressurized liquid upon urging of the valve member into an open position;

wherein in response to a differential pressure applied to the regulator being less than a first threshold value between a container pressure and an environmental pressure of an environment surrounding the dispenser, pressurized gas from the pressurized gas source is permitted to flow into the regulator chamber and the container until the first threshold value is achieved;

wherein in response to the differential pressure applied to the regulator being greater than the first threshold value between the container pressure and the environmental pressure, pressurized gas from the pressurized gas source is prevented from flowing into the regulator chamber and the container; and wherein the liquid dispenser is permanently affixed to the container and the container is non-refillable.

8. The container of claim 7 wherein the pressurized gas source is located within the container.

9. The container of claim 7 wherein the pressurized gas source is located exterior to the container and connected to the dispenser.

10. The container of claim 7 wherein the tube comprises a flexible tube.

11. The container of claim 7 wherein the effervescent liquid comprises a carbonated alcoholic beverage.

12. The container of claim 7 wherein the container complies with 27 C.F.R. 5.46 (2017).

13. The container of claim 7 wherein the container conforms with 49 C.F.R. 173.306 (2017).

14. The container of claim 7 wherein the liquid dispenser is permanently affixed by compression fit.

15. The container of claim 7 wherein the liquid dispenser is permanently affixed by a crimp fit.

16. The container of claim 7 wherein the pressurized gas source is connected to the regulator.

17. The container of claim 7 wherein the pressure within the container ranges from about zero to about 300 psi.

18. The container of claim 7 wherein a shaft extends through the dispenser and movement of the shaft permits pressurized gas from the pressurized gas source to flow which forces an effervescent liquid into the tube that in turn permits the effervescent liquid to pass through the dispenser and be dispensed from the spout.

19. The container of claim 18 further comprising a tap wherein movement of the shaft is caused by rotational movement of the tap.

20. The dispenser of claim 1 wherein the regulator and the pressurized gas source are in continuous fluid communication.

21. The container of claim 3 wherein the regulator and the pressurized gas source are in continuous fluid communication.

22. The container of claim 7 wherein the regulator and the pressurized gas source are in continuous fluid communication.

23. The container of claim 7 wherein a cap having outwardly extending portions is affixed to the container and wherein the dispenser defines a groove and wherein the dispenser is permanently affixed to the container by engaging the portions and the groove.

24. A container comprising an effervescent liquid and an effervescent liquid dispenser, the effervescent liquid dispenser comprising
    a regulator connected to the effervescent liquid dispenser and in selective fluid communication with the container and the effervescent liquid, the regulator and the dispenser being configured as a unitary assembly;
    a tube connected to the dispenser and extending into the container;
    a spout connected to the dispenser for dispensing the effervescent liquid;
    wherein the effervescent liquid dispenser is permanently affixed to the container with a crimp system and the container is non-refillable.

25. The container of claim 24 wherein the container has a capacity of greater than 200 ml and the headspace above the effervescent liquid is less than 8 percent of the total capacity.

26. The container of claim 24 further comprising a fluid shaft in a passageway and a valve member, the fluid shaft being along a length of the passageway, the fluid shaft and valve member being adapted to release pressurized liquid upon urging of the valve member into an open position.

27. The container of claim 24 wherein a clevis having outwardly extending portions is affixed to the container and wherein the effervescent liquid dispenser defines a groove and wherein the dispenser is permanently affixed to the container by engaging the portions and the groove.

28. The container of claim 24 wherein the crimp system comprises a cap having outwardly extending portions is affixed to the container and wherein the dispenser defines a groove and wherein the dispenser is permanently affixed to the container by engaging the portions and the groove.

\* \* \* \* \*